United States Patent
Shi et al.

(10) Patent No.: US 11,540,251 B2
(45) Date of Patent: Dec. 27, 2022

(54) METHOD AND APPARATUS FOR MONITORING PAGING MESSAGES

(71) Applicant: LENOVO (BEIJING) LIMITED, Beijing (CN)

(72) Inventors: Jie Shi, Beijing (CN); Lianhai Wu, Beijing (CN); Jing Han, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 145 days.

(21) Appl. No.: 16/982,754

(22) PCT Filed: Mar. 30, 2018

(86) PCT No.: PCT/CN2018/081425
§ 371 (c)(1),
(2) Date: Sep. 21, 2020

(87) PCT Pub. No.: WO2019/183950
PCT Pub. Date: Oct. 3, 2019

(65) Prior Publication Data
US 2021/0014825 A1      Jan. 14, 2021

(51) Int. Cl.
*H04W 68/02* (2009.01)
*H04W 76/28* (2018.01)
(Continued)

(52) U.S. Cl.
CPC ........... *H04W 68/02* (2013.01); *H04W 24/08* (2013.01); *H04W 52/0216* (2013.01); *H04W 52/0229* (2013.01); *H04W 76/28* (2018.02)

(58) Field of Classification Search
CPC . H04W 68/02; H04W 24/08; H04W 52/0216; H04W 52/0229; H04W 76/28;
(Continued)

(56) References Cited

U.S. PATENT DOCUMENTS

2016/0345292 A1   11/2016   Ljung et al.
2018/0007734 A1    1/2018   Kela et al.
(Continued)

FOREIGN PATENT DOCUMENTS

WO   2013149666 A1   10/2013
WO   2016146147 A1    9/2016

OTHER PUBLICATIONS

PCT/CN2018/081425, "International Search Report and the Written Opinion of the International Search Authority" ISA/CN, State Intellectual Property Office of the P.R. China, dated Dec. 18, 2018, pp. 1-6.

*Primary Examiner* — Peter P Chau
(74) *Attorney, Agent, or Firm* — Kunzler Bean & Adamson (57) ABSTRACT

The present disclosure is related to a method and apparatus for monitoring paging messages. A method for monitoring paging messages includes receiving wake up signal (WUS) configuration information; identifying whether a WUS mechanism is enabled; and monitoring a paging message in a paging occasion (PO) based on predefined PO monitoring configuration information. Wherein the predefined PO monitoring configuration information is associated with whether the WUS mechanism is enabled and at least one of the WUS configuration information and channel quality. The present disclosure improves the efficiency of paging remote units in a PO.

17 Claims, 6 Drawing Sheets

(51) Int. Cl.
*H04W 24/08* (2009.01)
*H04W 52/02* (2009.01)

(58) Field of Classification Search
CPC ......... H04W 52/0245; H04W 52/0219; H04W 52/0235; H04W 52/0238; Y02D 30/70
See application file for complete search history.

(56) References Cited

U.S. PATENT DOCUMENTS

| | | | |
|---|---|---|---|
| 2018/0234919 A1* | 8/2018 | Tsuda | H04W 88/04 |
| 2020/0029302 A1* | 1/2020 | Cox | H04W 76/27 |
| 2020/0145921 A1* | 5/2020 | Zhang | H04W 52/0229 |
| 2020/0196242 A1* | 6/2020 | Höglund | H04W 72/042 |
| 2020/0229095 A1* | 7/2020 | Shrestha | H04W 76/11 |
| 2020/0367168 A1* | 11/2020 | Hwang | H04W 76/28 |
| 2020/0374780 A1* | 11/2020 | Shan | H04W 48/10 |
| 2021/0227466 A1* | 7/2021 | Kim | H04W 68/005 |

* cited by examiner

METHOD AND APPARATUS FOR MONITORING PAGING MESSAGES

TECHNICAL FIELD

The present disclosure generally relates to wireless communication technology, and more specifically relates to monitoring paging messages in Narrow Band Internet of Things (NB-IoT) technology.

BACKGROUND OF THE INVENTION

In the NB-IoT technology, a wake up signal (WUS) mechanism is introduced for power saving, wherein a WUS indicates whether there is a paging process in a pre-defined paging occasion (PO).

Specifically, when the WSU mechanism is disabled, a remote unit always monitors paging messages on POs. When the WUS mechanism is enabled, the remote unit monitors the following possible paging messages in POs in response to the remote unit receiving a WUS, so that Physical Downlink Control Channel (PDCCH) blind detection can be performed. On the other hand, when the WUS mechanism is enabled, the remote unit will stop monitoring the following paging messages in POs in response to the remote unit not receiving any WUS.

However, due to channel quality of uplink (UL) and downlink (DL) or other complicated factors during a wireless communication procedure, the WSU mechanism may not work well under some conditions in NB-IoT technology. Given the above, improving monitoring paging messages under these conditions in NB-IoT technology is desirable.

BRIEF SUMMARY OF THE INVENTION

One objective of the embodiments of the present disclosure is to provide a solution of monitoring paging messages in the NB-IoT technology.

One embodiment of the present disclosure provides a method. The method may include: receiving WUS configuration information; identifying whether a WUS mechanism is enabled; and monitoring a paging message in a PO based on predefined PO monitoring configuration information. Wherein the predefined PO monitoring configuration information is associated with whether the WUS mechanism is enabled and at least one of the WUS configuration information and channel quality.

According to another embodiment of the present disclosure, the method may include: transmitting wake up signal configuration information; determining whether to transmit a paging message on a PO based on information obtained from a Mobility Management Entity (MME); and in response to determining to transmit the paging message on the PO and a WUS mechanism being enabled, transmitting a WUS.

Yet another embodiment of the present disclosure provides an apparatus. The apparatus include at least one processor and at least one memory including computer program codes. Wherein the at least one memory and the computer program codes are configured to, with the at least one processor, cause the apparatus to receive WUS configuration information, identify whether a WUS mechanism is enabled, and monitor a paging message in a PO based on predefined PO monitoring configuration information. Wherein the predefined PO monitoring configuration information is associated with whether the WUS mechanism is enabled and at least one of the WUS configuration information and channel quality.

A further embodiment of the present disclosure also provides an apparatus. The apparatus includes include at least one processor and at least one memory including computer program codes. Wherein the at least one memory and the computer program codes are configured to, with the at least one processor, cause the apparatus to transmit WUS configuration information; determine whether to transmit a paging message on a PO based on information obtained from a MME, and transmit a WUS in response to determining to transmit the paging message on the PO and a WUS mechanism being enabled.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended figures. These figures depict only example embodiments of the present disclosure and are not therefore to be considered as limiting of its scope.

DETAILED DESCRIPTION OF THE INVENTION

The detailed description of the appended figures is intended as a description of the currently preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Embodiments of the present disclosure provide methods and apparatus for monitoring paging messages in the NB-IoT technology. To facilitate understanding, embodiments of the present disclosure are provided under specific network architecture and service scenarios, such as 3GPP 5G NR (new radio), 3GPP LTE (Long Term Evolution) Release 8 and onwards. Persons skilled in the art are well-aware that, with developments of network architecture and new service scenarios, the embodiments in the present disclosure are also applicable to similar technical problems.

An example wireless communication system may include remote units and base units. The wireless communication system may further include Mobility Management Entities (MMEs). Persons skilled in the art well know that the number of remote units, base units, and MMEs in the wireless communication system may vary.

The remote units may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present disclosure, the remote units may include a portable wireless communication device, a smart phone, a cellular telephone, a flip phone, a device having a subscriber identity module, a personal computer, a selective call receiver, or any other device that is capable of sending and receiving communication signals on a wireless network. In another embodiment of the present disclosure, the remote units may include wearable devices, such as smart watches, fitness bands, optical head-mounted displays, or the like.

Moreover, the remote units may be referred to as subscriber units, mobiles, mobile stations, users, terminals, mobile terminals, wireless terminals, fixed terminals, subscriber stations, UE, user terminals, a device, or by other terminology used in the art. The remote units may communicate directly with a base unit via uplink or downlink communication signals.

The base units may be distributed over a geographic region. In certain embodiments of the present disclosure, a base unit may also be referred to as an access point, an access terminal, a base, a base station, a macro cell, a Node-B, an enhanced Node B (eNB), a gNB, a Home Node-B, a relay node, a device, or by any other terminology used in the art. The base units are generally part of a radio access network that may include one or more controllers communicably coupled to one or more corresponding base units.

The base units may be communicatively coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more base units may be communicatively coupled to a mobility management entity (MME), a serving gateway (SGW), and/or a packet data network gateway (PGW).

The base units may serve a number of remote units within a serving area, for example, a cell or a cell sector via a wireless communication link. The base units may directly communicate with one or more of the remote units via communication signals. For example, a base unit may serve remote units within a macro cell.

The base units transmits downlink communication signals to serve the remote units in the time, frequency, and/or spatial domain. Furthermore, the DL communication signals may be carried over wireless communication links. The wireless communication links may be any suitable carrier in licensed or unlicensed radio spectrum. The wireless communication links facilitate communication between the remote units and the base units.

The wireless communication system is compliant with any type of network that is capable of sending and receiving wireless communication signals. For example, the wireless communication system is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system is compliant with the long-term evolution (LTE) of the 3GPP protocol, wherein the base unit transmits using an orthogonal frequency division multiplexing (OFDM) modulation scheme on the DL and the remote units transmit on the UL using a single-carrier frequency division multiple access (SC-FDMA) scheme or OFDM scheme. More generally, however, the wireless communication system may implement some other open or proprietary communication protocol, for example, WiMAX, among other protocols.

In other embodiments, the base unit may communicate using other communication protocols, such as the IEEE 802.11 family of wireless communication protocols. Further, in an embodiment, the base unit may communicate over licensed spectrum, while in other embodiments the base unit may communicate over unlicensed spectrum. The present disclosure is not intended to be limited to the implementation of any particular wireless communication system architecture or protocol. In another embodiment, the base unit may communicate with remote units 101 using the 3GPP 5G protocols.

According to embodiments of the present disclosure, a WUS mechanism may be used for power saving in monitoring paging messages in POs. For persons skilled in the art, POs may be POs in a discontinuous reception (DRX) mode/extended DRX (eDRX) mode, or may be dedicated POs distributed in the DRX mode/eDRX mode. In one eDRX cycle of the eDRX mode, one paging transmission window (PTW) includes one or more POs. There may be multiple shortDRXs (sDRXs) in one PTW. In response to one PTW including multiple sDRXs, the number of PO may be countered based on a sDRX cycle.

Figure 1A:
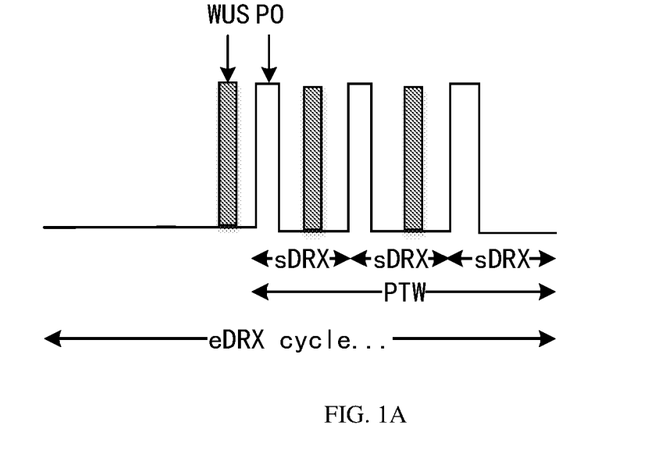
FIG. 1A illustrates a block diagram of mapping WUSs to POs according to an example embodiment of the present disclosure.

FIG. 1A illustrates a block diagram of mapping WUSs to POs according to an example embodiment of the present disclosure, wherein one WUS is mapped to one PO in an eDRX mode.

As shown in FIG. 1A, in one eDRX cycle of the eDRX mode, there are three sDRXs in one PTW, and each WUS is applied to each PO in one sDRX of the PTW. Persons skilled in the art well know that one PTW of the eDRX mode may include different numbers of sDRXs or POs. Thus, the number of sDRXs or POs and the number of WUSs mapped to POs may be different from this embodiment of the present disclosure.

Figure 1B:
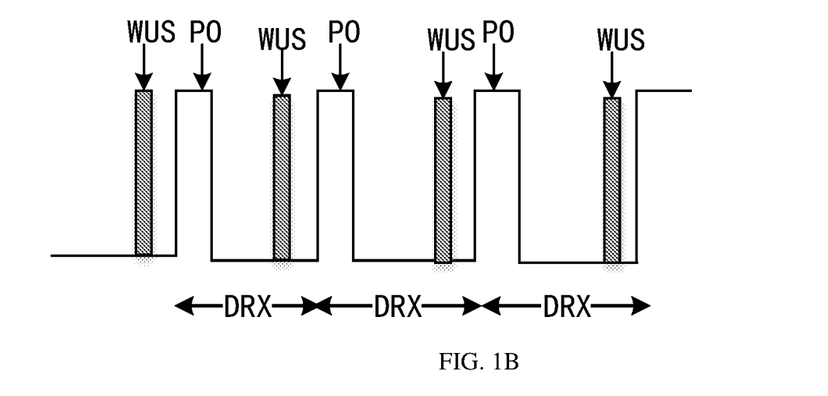
FIG. 1B illustrates a block diagram of mapping WUSs to POs according to another example embodiment of the present disclosure.

FIG. 1B illustrates a block diagram of mapping WUSs to POs according to another example embodiment of the present disclosure, wherein one WUS is mapped to one PO in a DRX mode. As shown in FIG. 1B, each WUS is applied to each PO in one DRX cycle in the DRX mode.

Figure 2A:
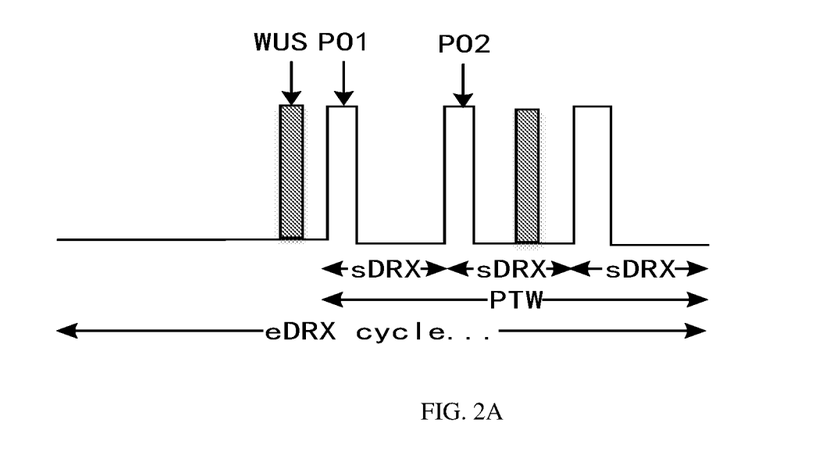
FIG. 2A illustrates a block diagram of mapping WUSs to POs according to yet another example embodiment of the present disclosure.

FIG. 2A illustrates a block diagram of mapping WUSs to PTWs according to yet another example embodiment of the present disclosure, wherein one WUS is mapped to multiple POs in an eDRX mode.

As shown in FIG. 2A, in one eDRX cycle of the eDRX mode, there are three sDRXs in one PTW. Each sDRX includes one PO, and one WUS is applied to two POs, i.e., PO1 and PO2 in one PTW of the eDRX mode. In another embodiment of the present disclosure, one WUS may be applied to all POs in one PTW. In addition, persons skilled in the art well know that one PTW of the eDRX mode may include different numbers of sDRXs or POs. Thus, the number of sDRXs or POs and the number of WUSs applied to POs may be various in different embodiments of the present disclosure.

Figure 2B:
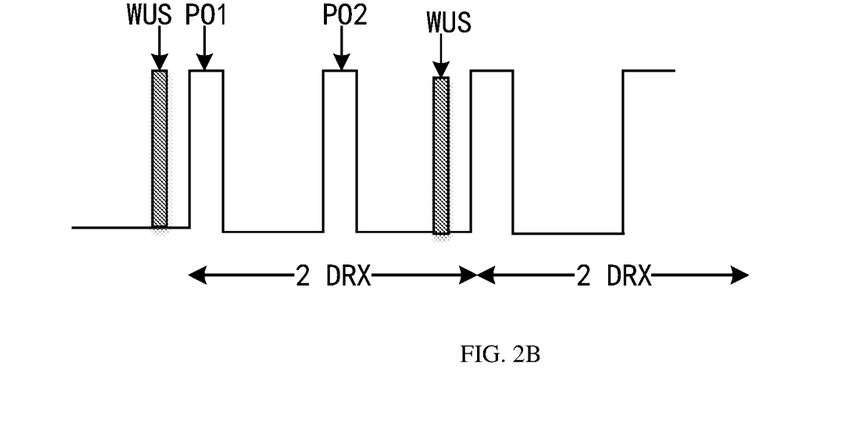
FIG. 2B illustrates a block diagram of mapping WUSs to POs according to a further example embodiment of the present disclosure.

FIG. 2B illustrates a block diagram of mapping WUSs to POs according to a further example embodiment of the present disclosure, wherein one WUS may be mapped to multiple POs in a DRX mode. As shown in FIG. 2B, a one WUS is applied to two POs in 2 DRX cycles. Persons skilled in the art well know that, in other embodiments of the present disclosure, one WUS may be applied to more than two DRX cycles in the DRX mode, for example, one WUS may be applied to three or more POs in the DRX mode.

According to some embodiments of the present disclosure, wireless communication system information received by remote units may carry indication of enabling or disabling a WUS mechanism, which may be in an explicit way or an implicit way. Under a certain scenario, indication of enabling or disabling a WUS mechanism could be specific for a specific remote unit. If an enabled/disabled status of a WUS mechanism is updated or changed, the WUS mechanism with a new status will be effective in a next eDRX cycle.

Under a certain scenario, in response to accessing a wireless communication network, the remote unit may read wireless communication system information to identify an enabled/disabled status of a WUS mechanism. In other words, the remote unit may determine whether the WUS mechanism is enabled based on the wireless communication system information. In response to the WUS mechanism being enabled, a remote unit may detect a WUS, and then monitor a paging message based on the detected WUS.

However, in some cases, although the WUS mechanism is enabled, the remote unit cannot detect the WUS. For example, due to interference from other remote units in the same cell, interference from other cell, the mobility of the remote unit, or being located in the edge of a cell, the channel quality for the remote unit may be degraded. Since the remote unit does not detect the WUS for a following PO, the remote unit will not monitor the paging messages in the PO based on this WUS. The remote unit will wait a next WUS in a next DRX cycle or a next eDRX cycle/PTW. Since the WUS mapped to the following PO(s) sent from the network side is not detected by the remote unit, the remote unit will miss the paging message(s) in the PO(s) to which the WUS is mapped. Accordingly, due to missing paging message(s), the remote unit may be out of service for a long time. For an instance, the remote unit may be out of service during a long DRX cycle or a long eDRX cycle. Given this, when a WUS is too weak to be detected, a solution of avoiding missing paging messages in POs is needed.

In an embodiment of the present disclosure, in response to a WUS mechanism being enabled, if a remote unit cannot detect a WUS, the remote unit may further determine the specific reason as to why the WUS is not detected, rather than directly determining that the WUS is not transmitted by a base station. In an embodiment of the present disclosure, a remote unit may report its measurement on the channel quality to a base station. The base station may transmit PO monitoring configuration information specific to the remote unit.

In the other hand, embodiments of the present disclosure also provide a solution of determining an identifier based on WUS indicating which PO group a remote unit belongs to. Generally, in a real scenario, multiple paging messages may be carried in one PO, and not all remote units are paged in one PO. For example, a half number of remote units may be paged in one PO. According to an embodiment of the present disclosure, the remote units may be divided into different groups, and a WUS signal is associated with a specific group of remote units and indicates the PO associated with the specific group. During a paging process, only remote units within the specific group may monitor a paging message in the associated PO based on the WUS, while other remote units not included in this specific group do not monitor the paging message in the associated PO based on the WUS. Accordingly, this embodiment could save more power of remote units during the paging process.

Figure 3:
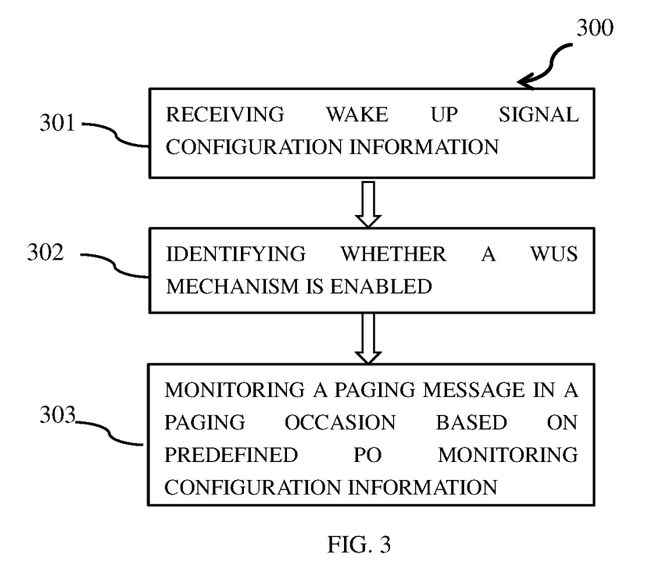
FIG. 3 illustrates a flowchart demonstrating a method of monitoring paging messages according to an example embodiment of the present disclosure.

FIG. 3 illustrates a flowchart demonstrating a method 300 of monitoring paging message according to an example embodiment of the present disclosure, which may be performed on an apparatus, such as a remote unit.

In step 301 of FIG. 3, WUS configuration information is received. For example, the WUS configuration information may be received by the remote unit, such as a UE, from a network side, such as a base station.

In step 302 of FIG. 3, whether a WUS mechanism is enabled is identified. In certain embodiments of the present disclosure, the received WUS configuration information may include information indicating whether the WUS mechanism is enabled. Accordingly, identifying whether a WUS mechanism is enabled is performed based on the WUS configuration information. In certain embodiments of the present disclosure, information indicating whether the WUS mechanism is enabled may be separately transmitted.

In step 303 of FIG. 3, a paging message in a PO is monitored based on predefined PO monitoring configuration information. The predefined PO monitoring configuration information may be associated with whether the WUS mechanism is enabled, and associated with at least one of the WUS configuration information and channel quality.

According to an embodiment of the present disclosure, the predefined PO monitoring configuration information is preconfigured in accordance with a network protocol. According to another embodiment of the present disclosure, the predefined PO monitoring configuration information is received from the network side. For example, the predefined PO monitoring configuration information is received from a base station.

In particular, based on the predefined PO monitoring configuration information, the operation of monitoring paging messages in POs may be performed in different manners. For instance, the predefined PO monitoring configuration information may be selected from the following options: in response to channel quality being lower than a threshold, monitoring a paging message in a PO in a DRX/eDRX mode; in response to channel quality being higher than or equal to a threshold, monitoring a paging message in a PO in a DRX/eDRX mode based on a detected WUS; in response to a WUS mechanism being enabled, monitoring a paging message in a dedicated PO distributed in a DRX/eDRX mode; in response to channel quality being lower than a threshold and a WUS mechanism being enabled, monitoring a paging message in a dedicated PO distributed in a DRX/eDRX mode; and in response to channel quality being lower than a threshold and a WUS mechanism being enabled while a WUS not being detected, monitoring a paging message in a dedicated PO distributed in a DRX/eDRX mode. According to an embodiment of the present disclosure, a DRX cycle in the DRX mode is longer than a first predefined time length. According to another embodiment of the present disclosure, an eDRX cycle in the eDRX mode is longer than a second predefined time length. According to a further embodiment of the present disclosure, a PTW length in the eDRX mode is longer than a third predefined time length. The first, second, and third predefined time lengths may be identical or different.

According to an embodiment of the present disclosure, dedicated PO(s) may be the first N1 PO(s) in a PTW in the eDRX mode, wherein N1 is an integer. Alternatively, dedicated PO(s) may be the last N2 PO(s) in a PTW in the eDRX mode, wherein N2 is an integer. According to another embodiment of the present disclosure, dedicated PO(s) may be distributed through a DRX/eDRX cycle in the DRX/eDRX mode. For example, dedicated PO(s) may be evenly distributed within the DRX/eDRX cycles in the DRX/eDRX mode. The dedicated PO(s) could be distributed within the dedicated DRX/eDRX cycles in the DRX/eDRX mode. For example, the dedicated PO(s) in the dedicated DRX cycle is with DRX number mode N=n, where the DRX number is computed from the system frame number (SFN)=0 and subframe=0. The dedicated PO(s) could be distributed within the dedicated eDRX cycles in the eDRX mode. For example, the dedicated PO(s) in the dedicated eDRX cycle with eDRX number mode M=m, where the eDRX number is computed from hyper frame number (HFN)=0, the SFN=0 and subframe=0. For another example, the dedicated PO(s) in the dedicated eDRX cycle is with eDRX number mode M=m and dedicated PO(s) is in the dedicated PO(s) in PTW in the dedicated eDRX cycle. In an embodiment of the present disclosure, channel quality over a reference signal (RS) and/or a WUS may be measured for example by a remote unit. For instance, a UE may measure channel quality over a RS and/or a WUS based on at least one of the following parameters: reference signal receiving power (RSRP), reference signal receiving quality (RSRQ), signal noise ratio (SNR), signal to interference plus noise ratio (SINR), received signal strength indication (RSSI), or any other parameters.

For example, in response to the channel quality measured based on RSRP/RSPQ being lower than a threshold, one or more POs in DRX mode or in a PTW within an eDRX mode may be continuously monitored. In another example, in response to channel quality measured based on RSRP/RSPQ being higher or equal a threshold, one or more POs based on a detected WUS may be continuously monitored. In yet another example, in response to the WUS mechanism being enabled, dedicated PO(s) distributed in a DRX/eDRX mode may be monitored no matter how the channel quality is. In a further example, in response to the WUS mechanism being enabled and the channel quality based on RSRP/RSPQ being lower than a threshold, dedicated PO(s) distributed in a DRX/eDRX mode may be monitored.

According to an embodiment of the present disclosure, indication information, such as, channel quality and/or a detection result of a WUS may be reported to the network side. For example, for a detected WUS, the detection result of the WUS may be reported to the base station by the remote unit. In response to the WUS mechanism being enabled while no WUS is detected, the channel quality and the detection result of no WUS being detected may be reported to the base station.

According to another embodiment of the present disclosure, short or simple indication information may be reported to the network side. For example, requirements of enabling/disabling a WUS mechanism may be transmitted by the remote unit to the base station, or the current channel quality may be reported to the base station, which may below or high than a threshold.

According to an embodiment of the present disclosure, the indication information is transmitted in a random access (RA) preamble transmission procedure. The indication information may be associated with RA preamble resource in time/frequency/code domain. The indication information may be whether the WUS is detected. The indication information may be transmitted explicitly or implicitly in Msg.1 or Msg.3 in RA procedure. Msg.1 is a random access preamble transmission message. In response to the indication information being transmitted from a remote unit to a base station in Msg.1, the base station may feedback information to the remote unit through a random access response (RAR) message or a Radio Resource Control (RRC) message. In response to the indication information being transmitted from a remote unit to a base station in Msg.3, the base station may feedback information to the remote unit through the RRC message.

In an embodiment of the present disclosure, the method 300 may further include receiving an identifier based on WUS indicating which PO group a remote unit belongs to (hereafter, "paging group ID"). The paging group ID may be obtained via ATTACH procedure or TAU procedure, which will be specifically illustrated in the following text.

Figure 4:
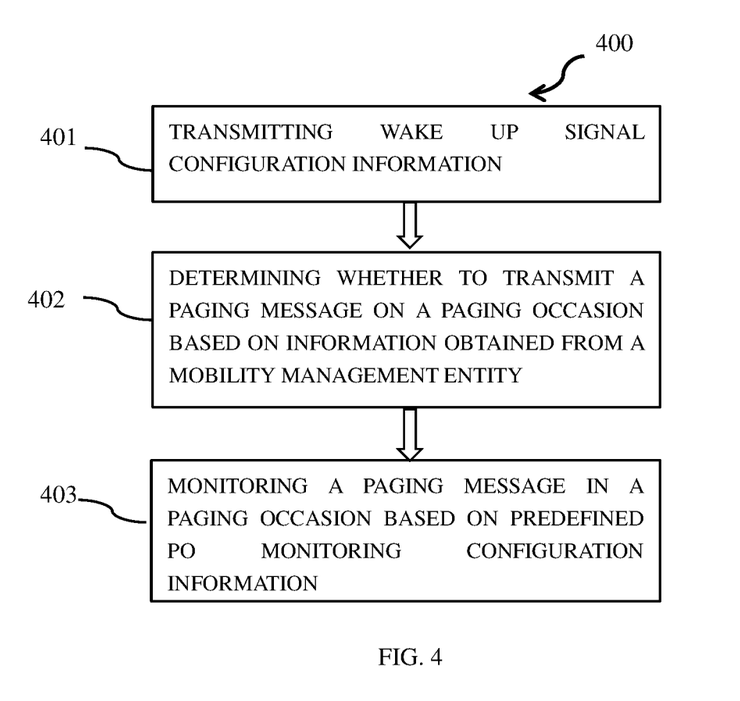
FIG. 4 illustrates a flowchart demonstrating a method of monitoring paging messages according to another example embodiment of the present disclosure.

FIG. 4 illustrates a flowchart of a method 400 of monitoring paging messages according to another example embodiment of the present disclosure, which may be performed in the network side, such as being performed by the remote unit.

In step 401 of FIG. 4, WUS configuration information is transmitted. For example, the WUS configuration information may be transmitted by the network side, such as the base station, to the remote unit, such as a UE.

In step 402 of FIG. 4, whether to transmit a paging message on a PO is determined based on information obtained from a MME. For example, the base station may determine whether to transmit a paging message in a PO based on the information obtained from the MME, and then transmit a paging message in a following PO to the remote unit.

In step 403 of FIG. 4, in response to determining to transmit the paging message on the PO and the WUS mechanism being enabled, a WUS is transmitted. For example, in response to transmitting a paging message in a PO being determined and the WUS mechanism being enabled, the base station may transmit a WUS to the remote unit to save power during monitoring paging messages.

According to an embodiment of the present disclosure, predefined PO monitoring configuration information is not preconfigured according to the network protocols, and the network side indicates the predefined PO monitoring configuration information to the remote unit. The method 400 may further include indicating the remote unit to monitor the paging message based on the predefined PO monitoring configuration information. The predefined PO monitoring configuration information may be defined as described above.

In an embodiment of the present disclosure, the method 400 may further include receiving channel quality and/or a detection result of a WUS, wherein the channel quality is measured over a RS and/or a WUS. The method 400 may further include receiving other information related to monitoring paging message, such as requirements of enabling/disabling a WUS mechanism, and/or the indication of whether the WUS is detected. The channel quality and/or the detection result of a WUS may be transmitted explicitly or implicitly in Msg.1 or Msg.3 in RA procedure. Msg.1 is a random access preamble transmission message. In response to the channel quality and/or the detection result of a WUS being transmitted from a remote unit to a base station in Msg.1, the base station may feedback information to the remote unit through a RAR message or a RRC message. In response to the channel quality and/or the detection result of a WUS being transmitted from a remote unit to a base station in Msg.3, the base station may feedback information to the remote unit through the RRC message.

After receiving the information transmitted from the remote unit, the base station may transmit controlling/configuration information and/or feedback information to the remote unit to instruct subsequent operations of the remote unit. The information transmitted or feedback by the base station may be carried in a RRC message.

For instance, the base station may feedback WUS configuration information indicating the enabled/disabled status of a WUS mechanism to the remote unit. According to an embodiment of the present disclosure, the base station may transmit controlling/configuration information to indicate the remote unit to stop detecting a WUS but continue to monitor paging messages in POs. According to another embodiment of the present disclosure, the base station may transmit controlling/configuration information to indicate the remote unit to continue to monitor PO(s) or dedicated PO(s) based on the predefined PO monitoring configuration information. According to yet another embodiment of the present disclosure, the base station may transmit controlling/configuration information to indicate the remote unit to detect a WUS and further decide whether to monitor a PO based on whether a WUS is detected.

As stated above, embodiments of the present disclosure also provide a solution of determining a paging group ID, so that the power in monitoring paging message can be further saved.

According to an embodiment of the present disclosure, remote units may be divided into different groups based on traffic patterns of remote units. For example, remote units in same traffic pattern are paged simultaneously, and then a MME decides a paging group ID based on collected traffic information of these remote units. By this embodiment, an efficiency of paging remote units in the same paging group in a PO is improved.

According to another embodiment of the present disclosure, a PO is associated with a paging rating in time domain, and a remote unit with the same paging rating is in the same PO. The paging group ID may be determined based on identifiers of remote units.

Figure 5:
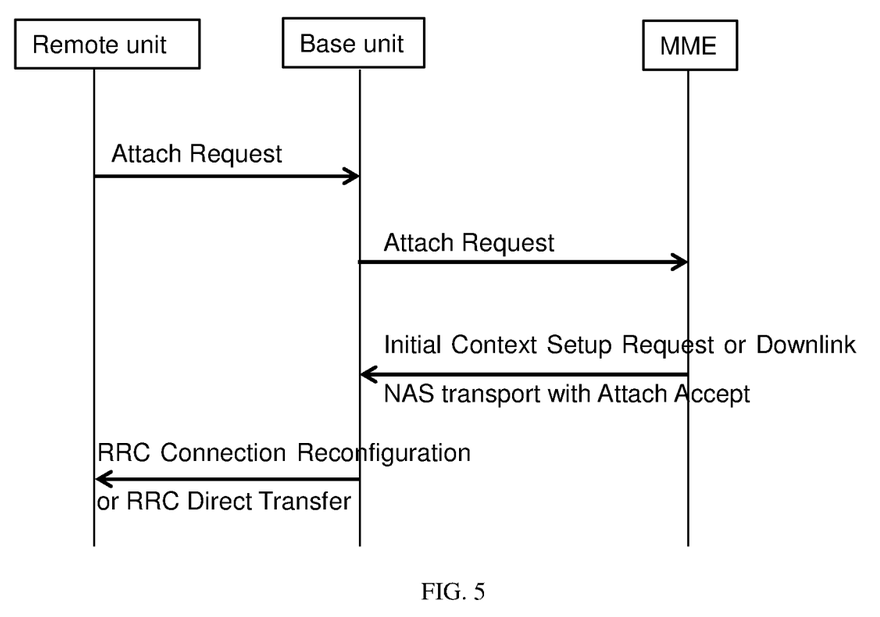
FIG. 5 illustrates an ATTACH procedure between a remote unit, a base station, and MME according to an embodiment of the present disclosure.

FIG. 5 illustrates an ATTACH procedure between a remote unit, a base station, and MME according to an embodiment of the present disclosure. In this embodiment, the remote unit negotiates the paging group ID in the ATTACH procedure.

As shown in FIG. 5, the remote unit transmits an Attach request message to the base unit, and the base unit transmits the Attach request message to the MME. The Attach request message may include grouping assistant information for determining the paging group ID. Then, the MME transmits an initial context setup request message or downlink Non-Access-Stratum (NAS) transport with Attach Accept message to the base unit, and the base unit transmits Radio Resource Control (RRC) Connection Reconfiguration message signal or RRC Direct Transfer message to the remote unit. The paging group ID may be included in the initial context setup request message, the downlink NAS transport with Attach Accept message, the RRC Connection Reconfiguration message, or the RRC Direct Transfer message.

The grouping assistant information is a general concept, and may include traffic period information of a remote unit, geo information, or service group information of a remote unit. For instance, the grouping assistant information is sent in Attach Request message. Alternatively, the grouping assistant information and eDRX parameters information are sent together.

After receiving the Attach request message, the MME may get legacy remote unit information from an old MME and conclude paging group ID information of remote units, and then transmit the paging group ID information to the base unit. In an example, the MME computes the paging group ID based on eDRX parameters, traffic period information, geo information, and service group information of these remote units.

Figure 6:
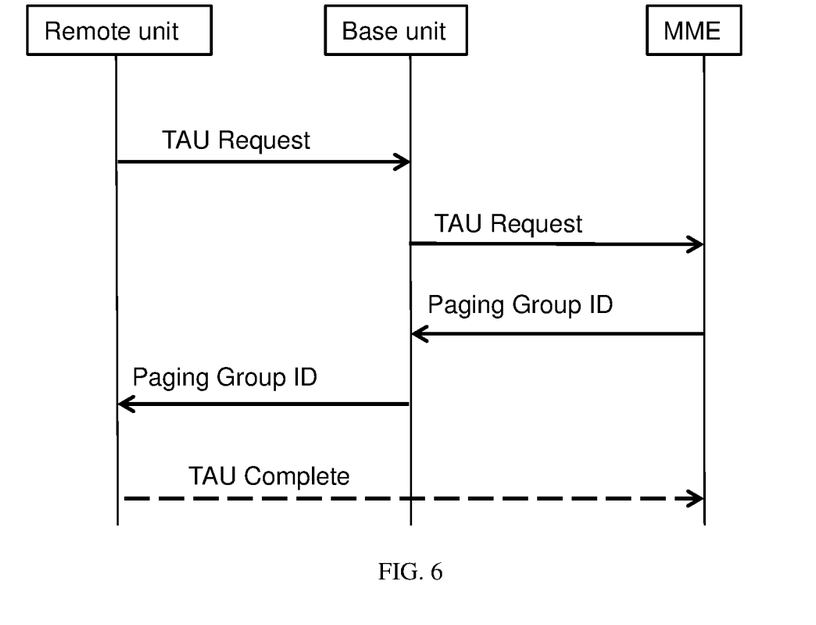
FIG. 6 illustrates a Tracking Area updating (TAU) procedure between a remote unit, a base station, and MME according to an embodiment of the present disclosure.

FIG. 6 illustrates a Tracking Area updating (TAU) procedure between a remote unit, a base station, and MME according to an embodiment of the present disclosure. In this embodiment, the remote unit negotiates the paging group ID in the TAU procedure.

As shown in FIG. 6, the remote unit transmits a TAU request message to the base unit, and the base unit transmits the TAU request message to the MME. The TAU request message may include grouping assistant information for determining the paging group ID. Then, the MME transmits the paging group ID to the base unit, and the base unit transmits a TAU Accept message to the remote unit, wherein the TAU Accept message includes the paging group ID. Then, the remote unit may transmit a TAU Complete message to the MME or not, and thus FIG. 6 shows this TAU Complete message in a dashed line.

Figure 7:
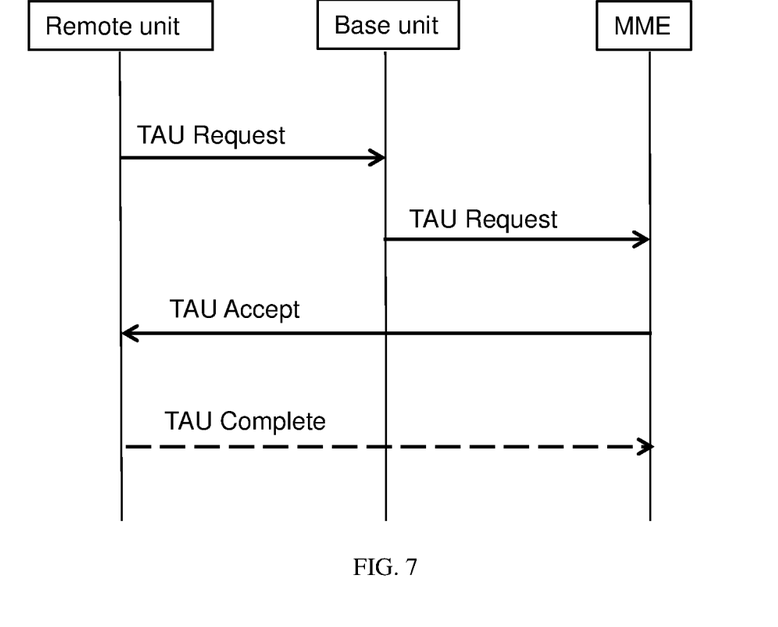
FIG. 7 illustrates a Tracking Area updating (TAU) procedure between a remote unit, a base station, and MME according to another embodiment of the present disclosure.

FIG. 7 illustrates a Tracking Area updating (TAU) procedure between a remote unit, a base station, and MME according to another embodiment of the present disclosure. In this another embodiment, a remote unit negotiates paging group ID in the TAU procedure.

As shown in FIG. 7, a remote unit transmits a TAU request message to a base unit, and the base unit transmits the TAU request message to a MME. Wherein the TAU request message includes grouping assistant information for determining a paging group ID. Then, the MME transmits a TAU Accept message to the remote unit, wherein the TAU Accept message includes the paging group ID. After that, the remote unit may transmit a TAU Complete message to the MME or not, and thus FIG. 7 shows this TAU Complete message in a dashed line.

All implementations of determining a paging group ID in descriptions of FIG. 5 of the present application are applicable for the embodiments of FIGS. 6 and 7.

Figure 8:
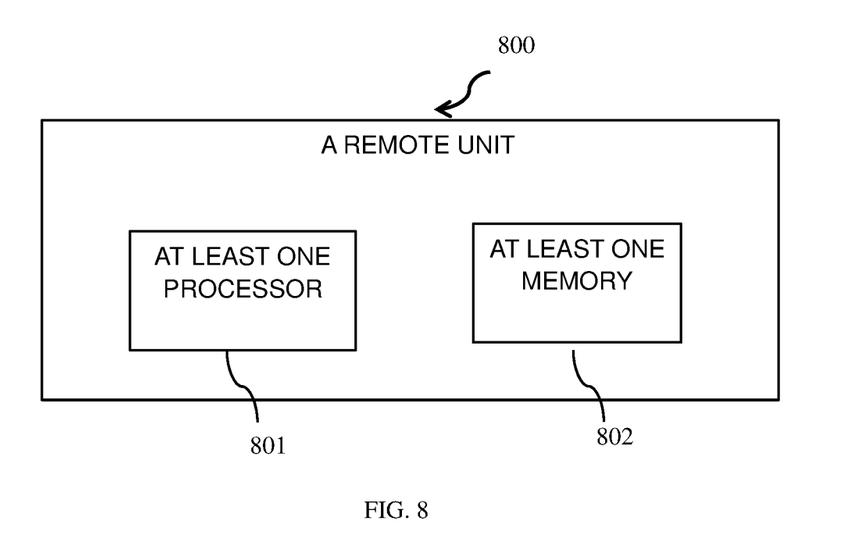
FIG. 8 illustrates a block diagram of an apparatus according to an example embodiment of the present disclosure.

FIG. 8 illustrates a block diagram of an apparatus 800 according to an embodiment of the present disclosure, which can perform a method of monitoring paging message as a remote unit. The apparatus 800 may at least one processor and at least one memory including computer program codes. Wherein the at least one memory and the computer program codes are configured to, with the at least one processor, cause the apparatus 800 to perform the method according to any one embodiment described in above of the present disclosure, for example the method 300. In certain embodiments of the present disclosure, the apparatus 800 may further include an input device, a display, a memory, and/or other elements. In certain embodiments of the present disclosure, the processor may be a microcontroller, a microprocessor, a CPU, a GPU, an auxiliary processing unit, a FPGA, or the like.

In one embodiment, the at least one memory and the computer program code are configured to, with the at least one processor, cause the apparatus 800 to receive WUS configuration information, identify whether a WUS mechanism is enabled, and monitor a paging message in a PO based on predefined PO monitoring configuration information, wherein the predefined PO monitoring configuration information is associated with whether the WUS mechanism is enabled and at least one of the WUS configuration information and channel quality.

The functions and implementations of all elements in the apparatus 800 and definitions of related technical terms can refer to the specific descriptions of FIGS. 3 and 5-7 and the foregoing corresponding paragraphs in this specification.

Figure 9:
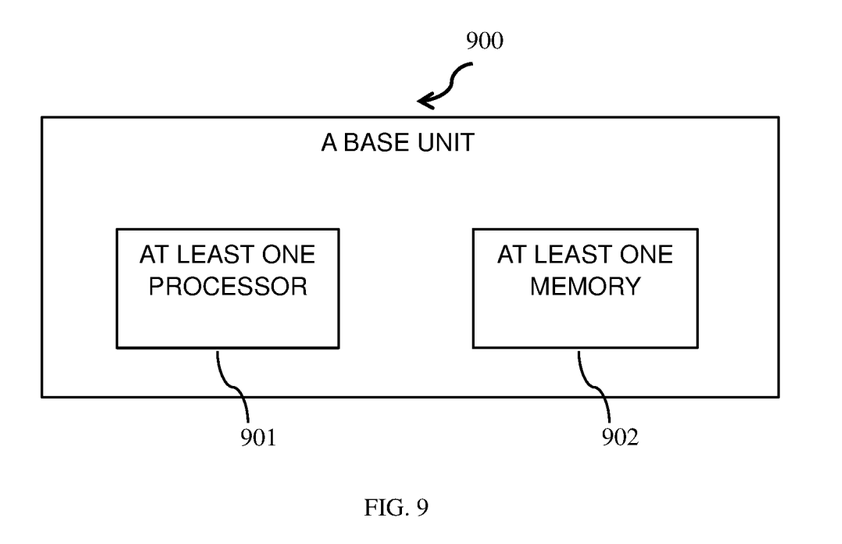
FIG. 9 illustrates a block diagram of an apparatus according to another example embodiment of the present disclosure.

FIG. 9 illustrates a block diagram of an apparatus 900 according to another embodiment of the present disclosure, which can perform a method of monitoring paging message in the network side, for example a base station. The apparatus 900 may include at least one processor and at least one memory including computer program code. Wherein the at least one memory and the computer program code are configured to, with the at least one processor, cause the apparatus 800 to perform the method according to any one embodiment described in above of the present disclosure. In certain embodiments, the apparatus 800 may further include an input device, a display, a memory, and/or other elements. In certain embodiments of the present disclosure, the processor may be, for example, a microcontroller, a microprocessor, a CPU, a GPU, an auxiliary processing unit, a FPGA, or the like.

In one embodiment, the at least one memory and the computer program code are configured to, with the at least one processor, cause the apparatus 800 to transmit WUS configuration information; determine whether to transmit a paging message on a PO based on information obtained from a MME, and transmit a WUS in response to determining to transmit the paging message on the PO and a WUS mechanism being enabled.

The functions and implementations of all elements in the apparatus 900 and definitions of related technical terms can refer to the specific descriptions of FIGS. 4-7 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "comprising."

What is claimed is:

1. A method, comprising:
receiving wake up signal configuration information;
identifying whether a wake up signal mechanism is enabled; and
monitoring a paging message in a paging occasion based on predefined paging occasion monitoring configuration information, wherein the predefined paging occasion monitoring configuration information is associated with whether the wake up signal mechanism is enabled and at least one of the wake up signal configuration information and channel quality, and the channel quality is measured over at least one of a reference signal and a wake up signal.

2. The method according to claim 1, wherein the predefined paging occasion monitoring configuration information is preconfigured in accordance with a network protocol or received from a network side.

3. The method according to claim 1, wherein the predefined paging occasion monitoring configuration information is selected from the following:
in response to the channel quality being lower than a threshold, monitoring the paging message in a paging occasion in a discontinuous reception mode/extended discontinuous reception mode;
in response to the channel quality being higher than or equal to the threshold, monitoring the paging message in the paging occasion in the discontinuous reception mode/extended discontinuous reception mode based on a detected wake up signal;
in response to the wake up signal mechanism being enabled, monitoring the paging message in a dedicated paging occasion distributed in the discontinuous reception mode/extended discontinuous reception mode;
in response to the channel quality being lower than the threshold and the wake up signal mechanism being enabled, monitoring the paging message in the dedicated paging occasion distributed in the discontinuous reception mode/extended discontinuous reception mode; and in response to the channel quality being lower than the threshold and the wake up signal mechanism being enabled while a wake up signal not being detected out, monitoring the paging message in the dedicated paging occasion distributed in the discontinuous reception mode/extended discontinuous reception mode.

4. The method according to claim 3, wherein an extended discontinuous reception cycle or a paging transmission window length in the extended discontinuous reception mode is longer than a predefined time length.

5. The method according to claim 1, wherein said identifying whether the wake up signal mechanism is enabled is based on the wake up signal configuration information.

6. The method according to claim 1, further comprising transmitting at least one of the channel quality and detection result of a wake up signal.

7. The method according to claim 1, further comprising receiving an identifier based on wake up signal indicating which paging occasion group a remote unit belongs to.

8. The method according to claim 1, further comprising:
transmitting an attach request message, wherein the attach request message includes grouping assistant information for determining an identifier based on wake up signal indicating which paging occasion group a remote unit belongs to; and
receiving radio resource control connection reconfiguration message or radio resource control direct transfer message, wherein the radio resource control connection reconfiguration message or radio resource control direct transfer message includes the identifier based on wake up signal indicating which paging occasion group a remote unit belongs to.

9. The method according to claim 1, further comprising:
transmitting a tracking area updating request message, wherein the tracking area updating request message includes grouping assistant information for determining an identifier based on wake up signal indicating which paging occasion group a remote unit belongs to;
receiving a tracking area updating accept message, wherein the tracking area updating accept message includes the identifier based on wake up signal; and
transmitting a tracking area updating complete message.

10. A method, comprising:
transmitting wake up signal configuration information;
determining whether to transmit a paging message on a paging occasion based on information obtained from a mobility management entity;
in response to determining to transmit the paging message on the paging occasion and a wake up signal mechanism being enabled, transmitting a wake up signal; and
receiving at least one of channel quality and detection result of a wake up signal, wherein the channel quality is measured over at least one of a reference signal and a wake up signal.

11. The method according to claim 10, further comprising indicating a remote unit to monitor the paging message based on predefined paging occasion monitoring configuration information.

12. The method according to claim 11, wherein the predefined paging occasion monitoring configuration information is preconfigured in accordance with a network protocol or received from a network side by the remote unit.

13. The method according to claim 11, wherein the predefined paging occasion monitoring configuration information is selected from the following:
in response to channel quality being lower than a threshold, monitoring the paging message in the paging occasion in a discontinuous reception mode/extended discontinuous reception mode;
in response to the channel quality being higher than or equal to the threshold, monitoring the paging message in the paging occasion based on a detected wake up signal in the discontinuous reception mode/extended discontinuous reception mode;
in response to the wake up signal mechanism being enabled, monitoring the paging message in a dedicated paging occasion distributed in the discontinuous reception mode/extended discontinuous reception mode;
in response to the channel quality being lower than the threshold and the wake up signal mechanism being enabled, monitoring the paging message in the dedicated paging occasion distributed in the discontinuous reception mode/extended discontinuous reception mode; and
in response to the channel quality being lower than the threshold and the wake up signal mechanism being enabled while a wake up signal not being detected out, monitoring the paging message in the dedicated paging occasion distributed in the discontinuous reception mode/extended discontinuous reception mode.

14. The method according to claim 13, wherein an extended discontinuous reception cycle or a paging transmission window length in the extended discontinuous reception mode is longer than a predefined time length.

15. The method according to claim 10, wherein the wake up signal configuration information indicates whether a wake up signal mechanism is enabled.

16. The method according to claim 10, further comprising:
receiving an attach request message from a remote unit, wherein the attach request message includes grouping assistant information for determining an identifier based on wake up signal indicating which paging occasion group the remote unit belongs to;
transmitting the attach request message to the mobility management entity;
receiving, from the mobility management entity, an initial context setup request message or downlink non-access-stratum transport with attach accept message, wherein the initial context setup request message or downlink non-access-stratum transport with attach accept message includes the identifier based on wake up signal; and
transmitting, to the remote unit, radio resource control connection reconfiguration message or radio resource control direct transfer message, wherein the radio resource control connection reconfiguration message or radio resource control direct transfer message includes the identifier based on wake up signal.

17. The method according to claim 10, further comprising:
receiving a tracking area updating request message from a remote unit, wherein the tracking area updating request message includes grouping assistant information for determining an identifier based on wake up signal indicating which paging occasion group a remote unit belongs to;
transmitting the tracking area updating request message to a mobility management entity; and receiving the identifier based on wake up signal from the mobility management entity.

\* \* \* \* \*